United States Patent
Broatch

(10) Patent No.: US 12,512,782 B2
(45) Date of Patent: Dec. 30, 2025

(54) PHOTOVOLTAIC ROOF TILES

(71) Applicant: Peter Broatch, Osmington (GB)

(72) Inventor: Peter Broatch, Osmington (GB)

( * ) Notice: Subject to any disclaimer, the term of this patent is extended or adjusted under 35 U.S.C. 154(b) by 0 days.

(21) Appl. No.: 19/007,510

(22) Filed: Jan. 1, 2025

(65) Prior Publication Data

US 2025/0158560 A1    May 15, 2025

Related U.S. Application Data

(63) Continuation of application No. PCT/GB2023/051397, filed on May 26, 2023.

(30) Foreign Application Priority Data

Jul. 1, 2022 (GB) ...................................... 2209698

(51) Int. Cl.
*H02S 20/25* (2014.01)
(52) U.S. Cl.
CPC .................... *H02S 20/25* (2014.12)
(58) Field of Classification Search
CPC ....................................................... H02S 20/25
See application file for complete search history.

(56) References Cited

U.S. PATENT DOCUMENTS

2018/0115275 A1* 4/2018 Flanigan ................. H02S 20/25

FOREIGN PATENT DOCUMENTS

EP    2557605    2/2013
GB    2493056    1/2013

OTHER PUBLICATIONS

WIPO, International Preliminary Report on Patentability in corresponding PCT application PCT/GB2023/051397, Dec. 12, 2023.

* cited by examiner

*Primary Examiner* — Jayne L Mershon
(74) *Attorney, Agent, or Firm* — Alley IP

(57) ABSTRACT

Photovoltaic roof tiles are provided with interlocking edges; however, these can be expensive to manufacture and time-consuming to install. A more cost-effective option of tiling may use a double-lap tile arrangement. Because plain tiles have no interlocking edges, water can leak through the joins between tiles. This requires a third tile to be placed below the join to catch any water passing through. With double-lap tiles, a significant part of each tile remains covered after installation, such that a relatively small surface area is in view of the sun. Photovoltaic roof tile 302 is useable with double-lap tiles 301, the photovoltaic roof tile 302 having a tile width equal to an integral multiple of the double-lap tile width. In this way, such photovoltaic roof tiles 302 may be arranged with conventional double-lap roof tiles 301 to increase the proportion thereof available to sunlight 305, 307, without risking ingress of water.

5 Claims, 5 Drawing Sheets

PHOTOVOLTAIC ROOF TILES

RELATED APPLICATIONS

Figure 1:
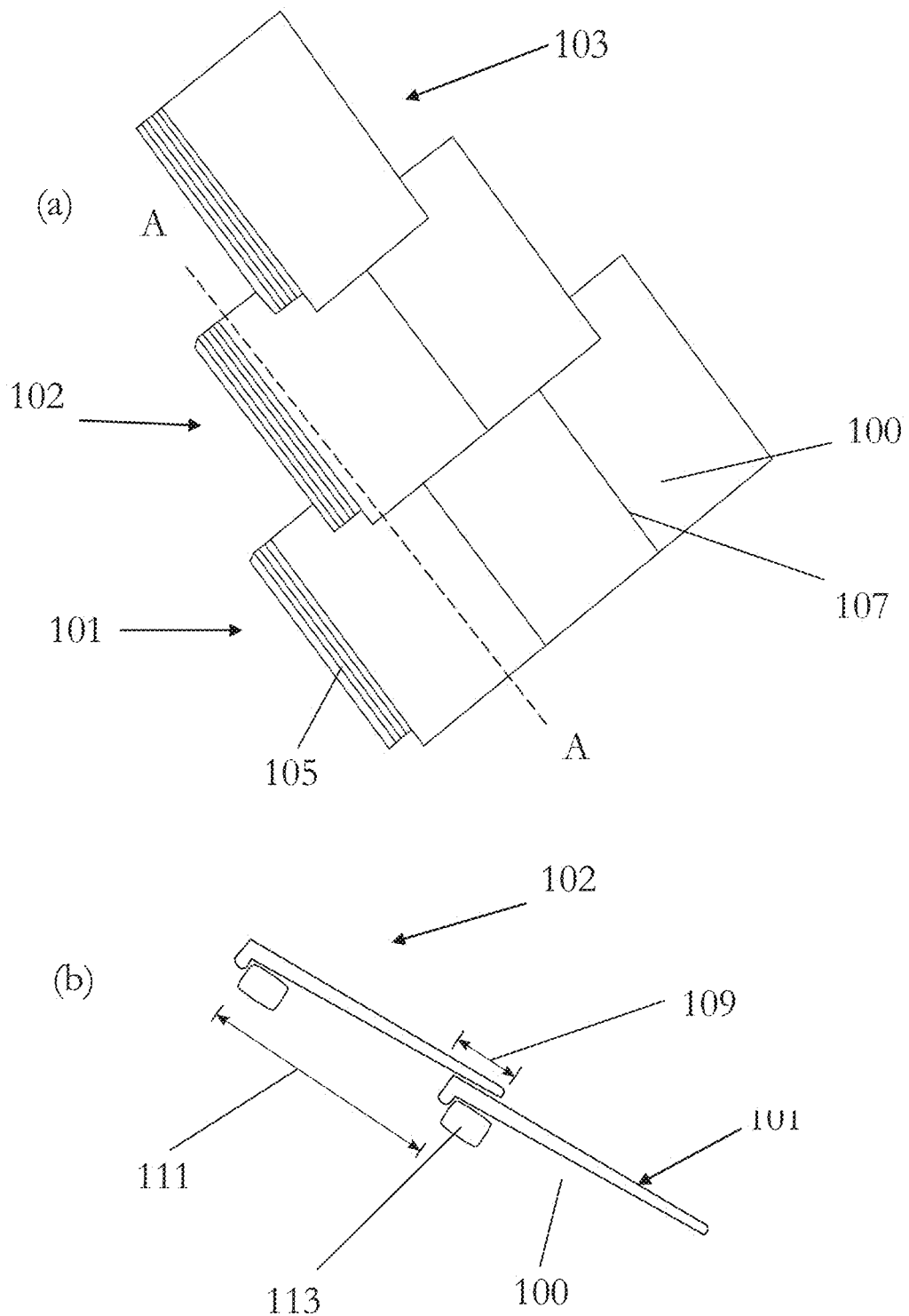

This application claims the benefit under 35 U.S.C. § 120, and is a continuation, of co-pending International Application PCT/GB2023/051397, filed May 26, 2023 and designating the US, which claims priority to GB Application 2209698.6, filed Jul. 1, 2022, such GB Applications also being claimed priority to under 35 U.S.C. § 119. These GB and International applications are incorporated by reference herein in their entireties.

FIELD

The present invention relates generally to photovoltaic roof tiles and a method of tiling a roof and finds particular, although not exclusive, utility in arranging such roof tiles on a roof.

BACKGROUND

Building-integrated photovoltaics are photovoltaic materials that are used to replace conventional building materials in parts of the building envelope such as the roof. On pitched roofs, photovoltaic roof tiles are known to replace conventional roof tiles, and can even be used interchangeably with such conventional roof tiles for easy replacement and upgrading.

Typically, such photovoltaic roof tiles are arranged in a single-lap arrangement, to maximise a surface area in view of the sun (i.e. by minimising an amount of overlap with adjacent tiles). To prevent rain water from passing between adjacent tiles and leaking into the building below, such photovoltaic roof tiles are provided with interlocking edges; however, these can be expensive to manufacture and time-consuming to install.

A more cost-effective option of tiling would be to use a double-lap tile arrangement, in which plain tiles without interlocking edges are used. Because plain tiles have no interlocking edges, water can leak through the joins between tiles. This requires a third tile to be placed below the join to catch any water passing through. However, with double-lap tiles, a significant part of each tile remains covered after installation, such that a relatively small surface area is in view of the sun. This not an efficient use of expensive photovoltaic materials.

In fact, in a double-lap arrangement, the typical proportion of a tile in view of the sun would be between one third and one half.

SUMMARY

According to a first aspect of the present invention, there is provided a photovoltaic roof tile for use with double-lap tiles having a double-lap tile height and a double-lap tile width, the photovoltaic roof tile having a tile width equal to an integral multiple of the double-lap tile width.

In this way, such photovoltaic roof tiles may be arranged with conventional double-lap roof tiles to increase the proportion thereof available to sunlight, without risking ingress of water, nor higher production costs.

Such tiles are typically rectangular, but may in some cases be square. A typical double-lap tile may have a double-lap tile height and/or width between 10 cm and 1 m, for example a tile height of approximately 60 cm, and a tile width of approximately 30 cm.

In the current disclosure, when a dimension is referred to as being equal to some other dimension (and/or an integral multiple thereof), this is intended to convey an approximate dimension, not an exact dimension. For example, if one larger tile is equivalent in size to two smaller tiles, this may be described as the larger tile being twice the width of each smaller tile; however, installation of tiles may require the placement of fixings, seals, spacers, air gaps, etc. therearound, and thus the size of the larger tile may in fact be slightly greater than twice that of the smaller tiles to take account of the presence of fixings between such smaller tiles.

Similarly, referring to a distance equal to a gauge of the roof, may be approximate, not least because the gauge on any part of a roof may typically differ by 10 mm to that on another part of the roof, sometimes more (e.g. 20 mm, 30 mm or 40 mm). Accordingly, the distance could be equal to a minimum, an average or a maximum gauge of the roof, or any distance therebetween. In addition, the distance being equal to the gauge of the roof may in practice differ from the theoretical distance discussed above, as installation of tiles may require the placement of fixings, seals, spacers, air gaps, etc. therearound, and thus the distance referred to may need to be varied accordingly.

The integral multiple may be two, three, four, five, six or more.

In this way, a larger integral multiple will result in a greater proportion of tile available to sunlight.

The photovoltaic roof tile may have a tile height equal to the double-lap tile height.

In this way, the photovoltaic roof tile will be installable without modification into existing double-lap roofing arrangements.

In this way, the proportion of tile available to sunlight is increased. The further integral multiple may be two, three, four, five, six or more. A larger further integral multiple will result in a greater proportion of tile available to sunlight.

According to a second aspect of the present invention, there is provided a roofing system comprising: a plurality of double-lap tiles, each double-lap tile having a common double-lap tile height and a common double-lap tile width; and a plurality of photovoltaic roof tiles having a tile width equal to an integral multiple of the double-lap tile width.

The common double-lap tile height means that each of the plurality of double-lap tiles has the same tile height as each other.

According to a third aspect of the present invention, there is provided an arrangement of roof tiles forming a part of a roof, the arrangement comprising: a plurality of double-lap tiles, each double-lap tile having a common double-lap tile height and a common double-lap tile width; and a plurality of photovoltaic roof tiles having a tile height equal to the common double-lap tile height and a tile width equal to an integral multiple of the double-lap tile width; the arrangement of roof tiles configured with: a first course of tiles comprising: a first photovoltaic roof tile of the plurality of photovoltaic roof tiles; and a second course of tiles arranged partially over the first course of tiles, and longitudinally offset from the first course of tiles by a longitudinal distance equal to a gauge of the roof, the second course of tiles comprising: a first overlapping tile selected from either of the plurality of double-lap tiles and the plurality of photovoltaic roof tiles, the first overlapping tile arranged to overlap a first upper corner of the first photovoltaic roof tile by a lateral distance equal to half the double-lap tile width; a second overlapping tile selected from either of the plurality of double-lap tiles and the plurality of photovoltaic roof tiles, the second overlapping tile arranged to overlap a second upper corner of the first photovoltaic roof tile by a lateral distance equal to half the double-lap tile width; and wherein a vacancy in the second course is provided between the first and second overlapping tiles, over the first photovoltaic roof tile; a third course of tiles arranged partially over the first and second courses of tiles, longitudinally offset from the first course of tiles by a longitudinal distance equal to the gauge of the roof, and longitudinally offset from the first course of tiles by a longitudinal distance equal to twice the gauge of the roof, the third course of tiles comprising: at least one top photovoltaic roof tile arranged to entirely overlap a top lateral edge of the first photovoltaic roof tile.

According to a fourth aspect of the present invention, there is provided a method of tiling a roof, the method comprising the steps of: providing a plurality of double-lap tiles, each double-lap tile having a common double-lap tile height and a common double-lap tile width; and providing a plurality of photovoltaic roof tiles having a tile height equal to the common double-lap tile height and a tile width equal to an integral multiple of the double-lap tile width; and arranging the plurality of double-lap tiles and the plurality of photovoltaic roof tiles such that: a first course of tiles comprises: a first photovoltaic roof tile of the plurality of photovoltaic roof tiles; and a second course of tiles arranged partially over the first course of tiles, and longitudinally offset from the first course of tiles by a longitudinal distance equal to a gauge of the roof, the second course of tiles comprising: a first overlapping tile selected from either of the plurality of double-lap tiles and the plurality of photovoltaic roof tiles, the first overlapping tile arranged to overlap a first upper corner of the first photovoltaic roof tile by a lateral distance equal to half the double-lap tile width; a second overlapping tile selected from either of the plurality of double-lap tiles and the plurality of photovoltaic roof tiles, the second overlapping tile arranged to overlap a second upper corner of the first photovoltaic roof tile by a lateral distance equal to half the double-lap tile width; and wherein a vacancy in the second course is provided between the first and second overlapping tiles, over the first photovoltaic roof tile; a third course of tiles arranged partially over the first and second courses of tiles, longitudinally offset from the first course of tiles by a longitudinal distance equal to the gauge of the roof, and longitudinally offset from the first course of tiles by a longitudinal distance equal to twice the gauge of the roof, the third course of tiles comprising: at least one top photovoltaic roof tile arranged to entirely overlap a top lateral edge of the first photovoltaic roof tile.

According to a fifth aspect of the present invention, there is provided an arrangement of roof tiles forming a part of a roof, the arrangement comprising: a plurality of double-lap tiles, each double-lap tile having a common double-lap tile height and a common double-lap tile width; and a plurality of photovoltaic roof tiles having a tile width equal to an integral multiple of the double-lap tile width; the arrangement of roof tiles configured with: a first course of tiles comprising: a first photovoltaic roof tile of the plurality of photovoltaic roof tiles; and an adjacent tile selected from the plurality of double-lap tiles and the plurality of photovoltaic roof tiles, the adjacent tile arranged adjacent to the first photovoltaic roof tile; a second course of tiles arranged partially over the first course of tiles, and diagonally offset from the first course of tiles by a lateral distance equal to one half of the double-lap tile width and a longitudinal distance equal to a gauge of the roof, the second course of tiles comprising: an overlapping tile selected from either of the plurality of double-lap tiles and the plurality of photovoltaic roof tiles, the overlapping tile arranged to overlap a corner of the first photovoltaic roof tile by a first lateral overlap distance equal to half the double-lap tile width, and arranged to overlap a corner of the adjacent tile adjacent to the corner of the first photovoltaic roof tile by a second lateral overlap distance equal to half the double-lap tile width; and wherein a vacancy in the second course is provided adjacent to the overlapping tile, over the first photovoltaic roof tile; a third course of tiles arranged partially over the first and second courses of tiles, diagonally offset from the second course of tiles by a lateral distance equal to one half of the double-lap tile width and a longitudinal distance equal to the gauge of the roof, and longitudinally offset from the first course of tiles by a longitudinal distance equal to twice the gauge of the roof, the third course of tiles comprising: at least one top photovoltaic roof tile arranged to entirely overlap a top lateral edge of the first photovoltaic roof tile.

The first course of tiles may be a first row of non-overlapping tiles arranged adjacent to one another. Adjacent may comprise being arranged with corresponding edges of adjacent tiles abutting one another, or involving a gap for the insertion of fixings, seals, etc., the gap having an extent much smaller than the dimensions of the tiles, for example less than 5% the width of a tile, more particularly less than 2%. In particular, adjacent may involve there being no overlap.

The second course of tiles may be a second row of non-overlapping tiles arranged adjacent to one another.

One course of tiles being arranged partially over another course of tiles may comprise the overlap being a headlap.

The lateral distance/direction may be in the direction of the double-lap tile width of double-lap tiles in a specific course/row, and may be substantially horizontal and/or orientated across the roof and/or within a row/course. The longitudinal distance/direction may be in the direction of the double-lap tile height of double-lap tiles in a specific course/row, and may be orientated up/down the roof and/or up/down successive courses/rows.

Each course/row may be parallel to each other course/row.

The vacancy in the second course may be a space in the second course in which one or more tiles are not placed. In particular, the vacancy may have a width equal to a still further integral multiple of the double-lap tile width.

The third course of tiles may be a third row of non-overlapping tiles arranged adjacent to one another.

The lateral edge of the first photovoltaic roof tile may comprise an upper edge thereof.

The first course of tiles may further comprise a further adjacent tile selected from the plurality of double-lap tiles and the plurality of photovoltaic roof tiles, the further adjacent tile arranged adjacent to the first photovoltaic roof tile, on an opposite side thereof to the adjacent tile.

The second course of tiles may further comprise a further overlapping tile selected from either of the plurality of double-lap tiles and the plurality of photovoltaic roof tiles, the further overlapping tile arranged to overlap a further corner of the first photovoltaic roof tile and a corner of the further adjacent tile adjacent to the further corner of the first photovoltaic roof tile.

The vacancy in the second course may be further provided adjacent to the further overlapping tile.

According to a sixth aspect of the present invention, there is provided a method of tiling a roof, the method comprising the steps of: providing a plurality of double-lap tiles, each double-lap tile having a common double-lap tile height and a common double-lap tile width; and providing a plurality of photovoltaic roof tiles having a tile width equal to an integral multiple of the double-lap tile width; and arranging the plurality of double-lap tiles and the plurality of photovoltaic roof tiles such that: a first course of tiles comprises: a first photovoltaic roof tile of the plurality of photovoltaic roof tiles; and an adjacent tile selected from the plurality of double-lap tiles and the plurality of photovoltaic roof tiles, the adjacent tile arranged adjacent to the first photovoltaic roof tile; a second course of tiles is arranged partially over the first course of tiles, and diagonally offset from the first course of tiles by a lateral distance equal to one half of the double-lap tile width and a longitudinal distance equal to a gauge of the roof, the second course of tiles comprising: an overlapping tile selected from either of the plurality of double-lap tiles and the plurality of photovoltaic roof tiles, the overlapping tile arranged to overlap a corner of the first photovoltaic roof tile and a corner of the adjacent tile adjacent to the corner of the first photovoltaic roof tile; and wherein a vacancy in the second course is provided adjacent to the overlapping tile, over the first photovoltaic roof tile; a third course of tiles is arranged partially over the first and second courses of tiles, diagonally offset from the second course of tiles by a lateral distance equal to one half of the double-lap tile width and a longitudinal distance equal to a gauge of the roof, and longitudinally offset from the first course of tiles by a longitudinal distance equal to twice the gauge of the roof, the third course of tiles comprising: at least one top photovoltaic roof tile arranged to entirely overlap a lateral edge of the first photovoltaic roof tile.

BRIEF DESCRIPTION OF THE ACCOMPANYING DRAWINGS

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

Figure 2:
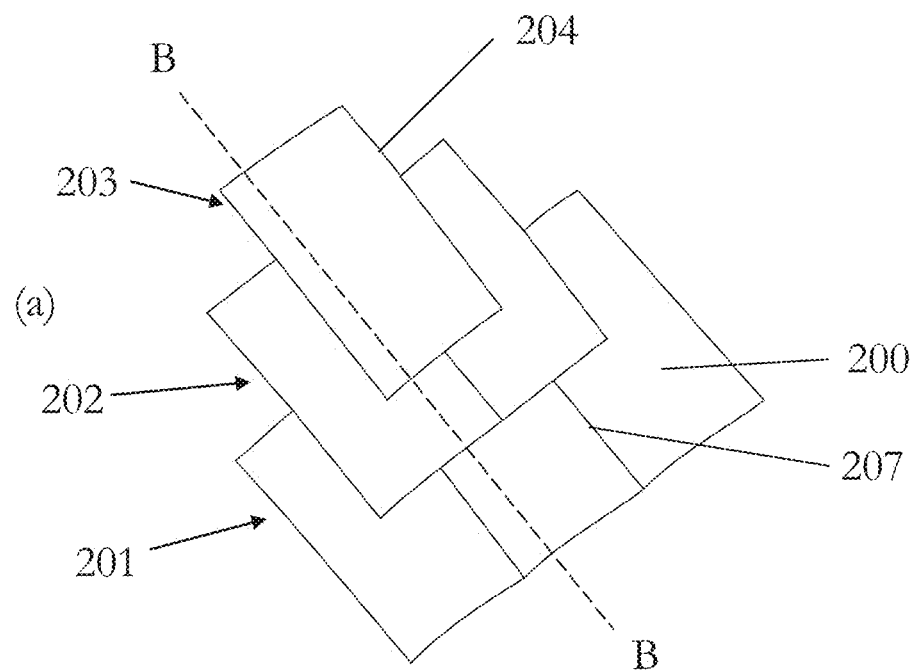
Figure 2:
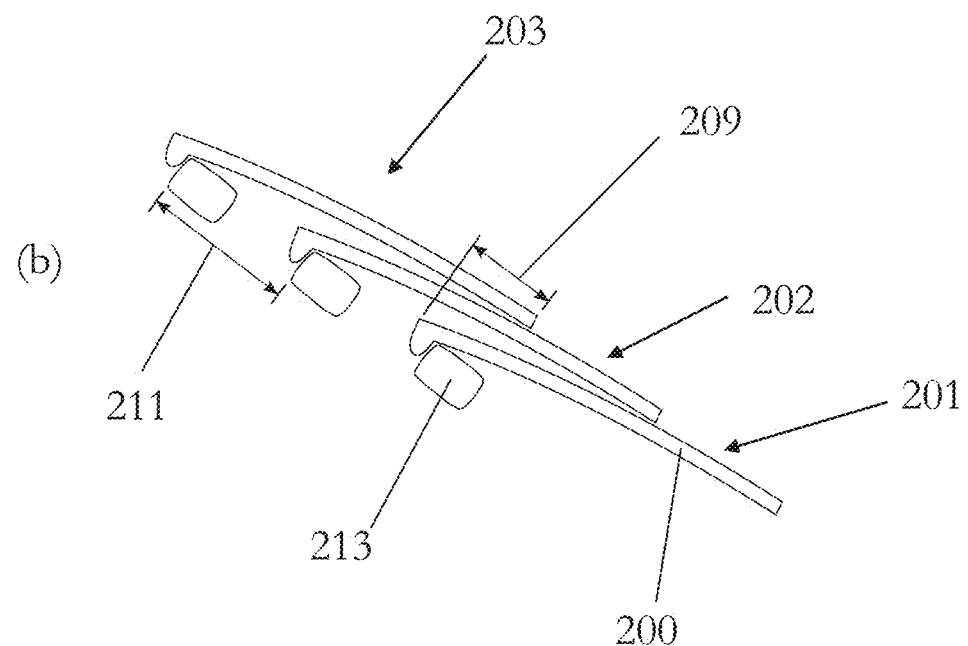
Figure 3:
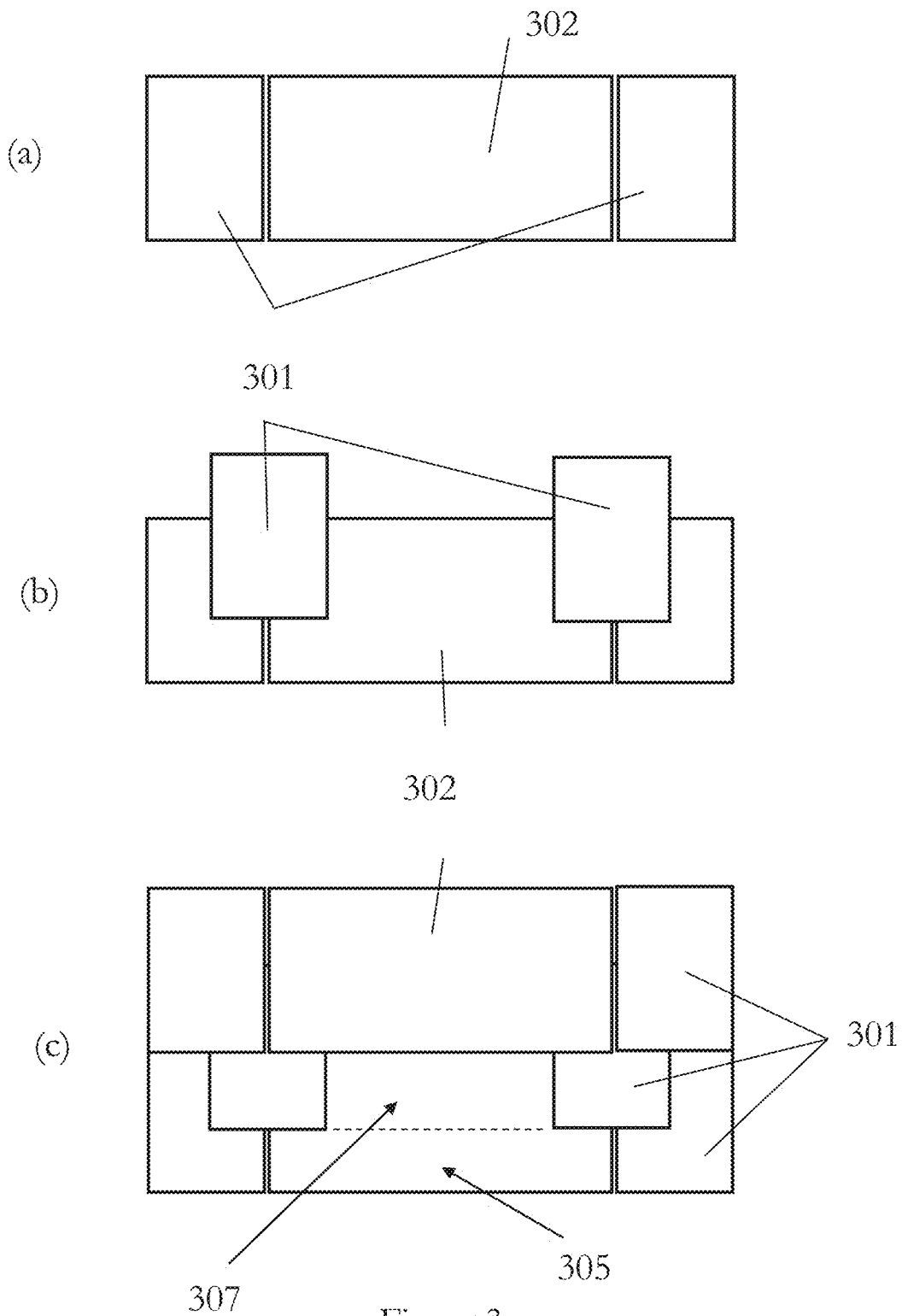
Figure 4:
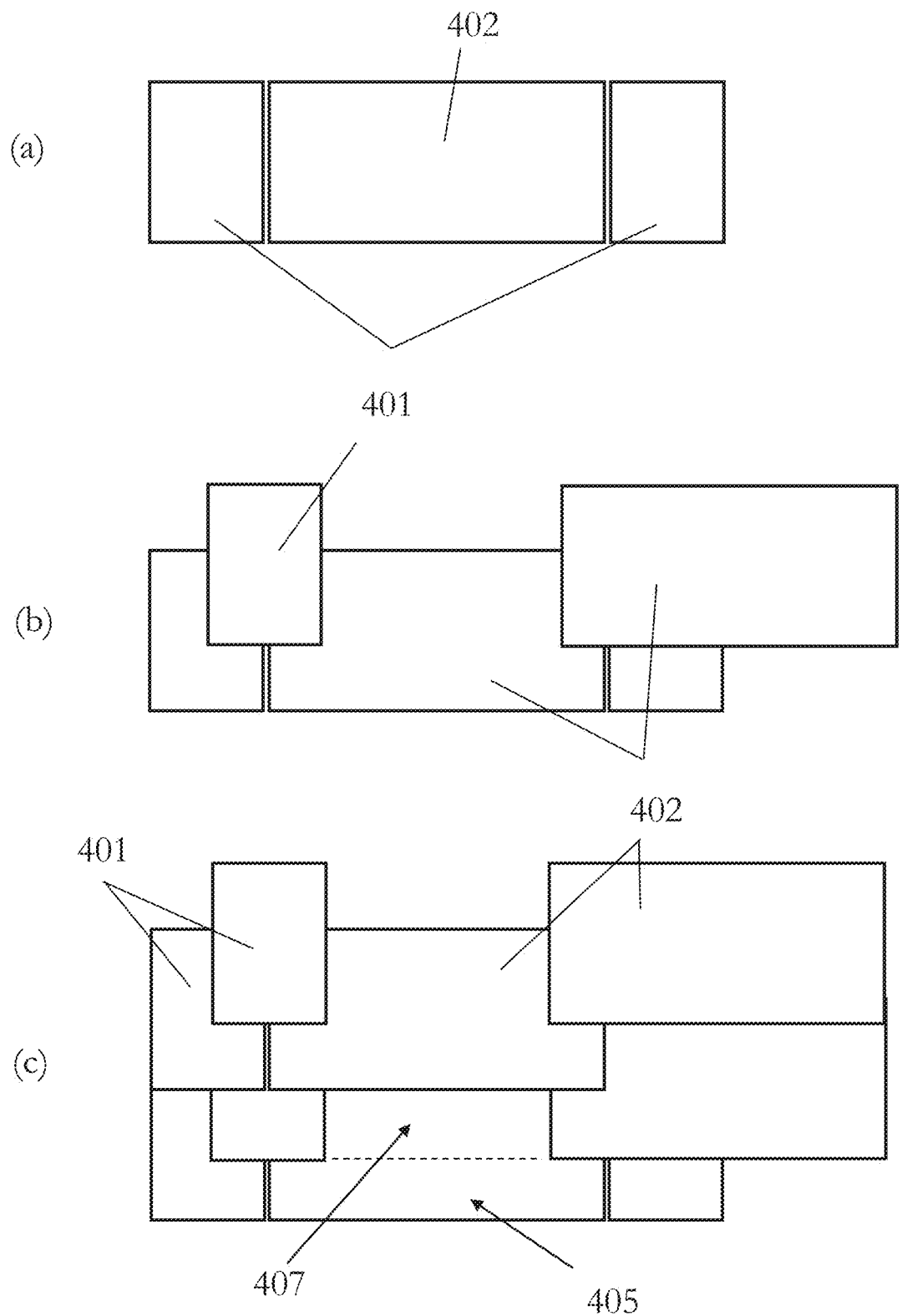
Figure 5:
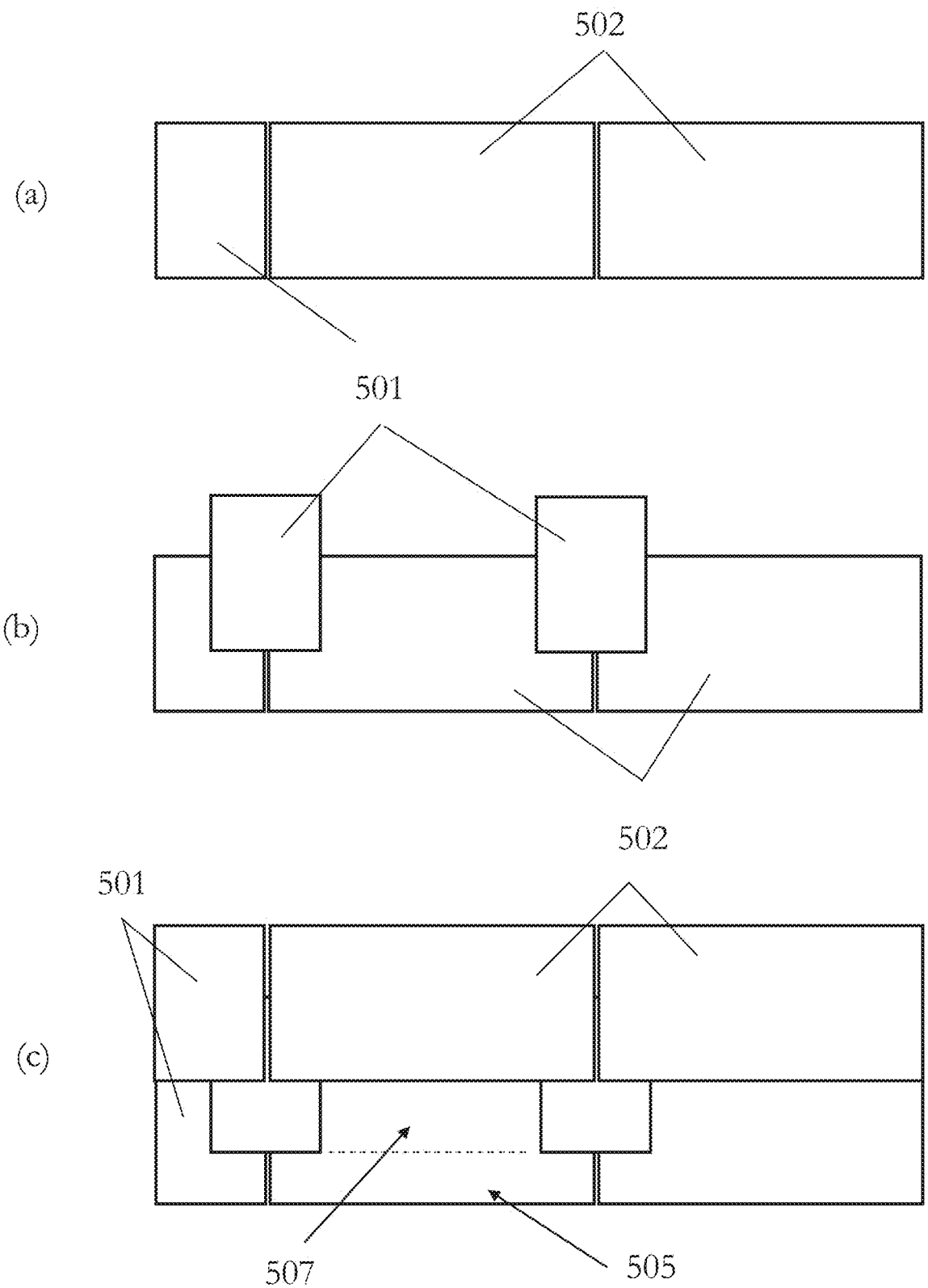

FIG. 1 shows conventional single-lap tiling.
FIG. 2 shows conventional double-lap tiling.
FIG. 3 shows a first arrangement of tiles.
FIG. 4 shows a second arrangement of tiles.
FIG. 5 shows a third arrangement of tiles.

DETAILED DESCRIPTION

The present invention will be described with respect to certain drawings but the invention is not limited thereto but only by the claims. The drawings described are only schematic and are non-limiting. Each drawing may not include all of the features of the invention and therefore should not necessarily be considered to be an embodiment of the invention. In the drawings, the size of some of the elements may be exaggerated and not drawn to scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that operation is capable in other sequences than described or illustrated herein. Likewise, method steps described or claimed in a particular sequence may be understood to operate in a different sequence.

Moreover, the terms top, bottom, over, under and the like in the description and the claims are used for descriptive purposes and not necessarily for describing relative positions. It is to be understood that the terms so used are interchangeable under appropriate circumstances and that operation is capable in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "an embodiment" or "an aspect" means that a particular feature, structure or characteristic described in connection with the embodiment or aspect is included in at least one embodiment or aspect of the present invention. Thus, appearances of the phrases "in one embodiment", "in an embodiment", or "in an aspect" in various places throughout this specification are not necessarily all referring to the same embodiment or aspect, but may refer to different embodiments or aspects. Furthermore, the particular features, structures or characteristics of any one embodiment or aspect of the invention may be combined in any suitable manner with any other particular feature, structure or characteristic of another embodiment or aspect of the invention, as would be apparent to one of ordinary skill in the art from this disclosure, in one or more embodiments or aspects.

Similarly, it should be appreciated that in the description various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Moreover, the description of any individual drawing or aspect should not necessarily be considered to be an embodiment of the invention. Rather, as the following claims reflect, inventive aspects lie in fewer than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some features included in other embodiments, combinations of features of different embodiments are meant to be within the scope of the invention, and form yet further embodiments, as will be understood by those skilled in the art. For example, in the following claims, any of the claimed embodiments can be used in any combination.

In the description provided herein, numerous specific details are set forth. However, it is understood that embodiments of the invention may be practised without these specific details. In other instances, well-known methods, structures and techniques have not been shown in detail in order not to obscure an understanding of this description.

In the discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The use of the term "at least one" may mean only one in certain circumstances. The use of the term "any" may mean "all" and/or "each" in certain circumstances.

The principles of the invention will now be described by a detailed description of at least one drawing relating to exemplary features. It is clear that other arrangements can be configured according to the knowledge of persons skilled in the art without departing from the underlying concept or technical teaching, the invention being limited only by the terms of the appended claims.

FIG. 1 shows conventional single-lap tiling. (a) is a perspective view of six tiles 100 arranged single-lap.

A first course 101, comprising three tiles 100 is shown. Each tile is provided with interlocking male portions 105 on a left-hand-side thereof, and female portions (not shown) on a right-hand-side thereof, such that a waterproof join 107 is formed between adjacent tiles.

A second course 102, comprising two tiles 100, is disposed partially overlapping the first course 101, with the tiles offset such that a join 107 between the tiles 100 of the second course 102 lies directly between two joins 107 between the tiles 100 of the first course 101.

Similarly, a third course 103, comprising a single tile 100, is disposed partially overlapping the second course 102, and offset from the second course 102, such that it is aligned with the first course 101; that is, a join 107 between tiles 100 of the third course 103 would align with joins 107 between the tiles 100 of the first course 101.

(b) shows a cross-section through the arrangement of (a) along line A-A. The tiles 100 of the first 101 and second 102 courses overlap by a headlap 109, and are offset from each other by a gauge 11, equal to the spacing of adjacent roof battens 113.

FIG. 2 shows conventional double-lap tiling. (a) is a perspective view of six tiles 200 arranged double-lap.

A first course 201, comprising three tiles 200 is shown. Each tile is provided with nail holes 105 for fixing to roof battens. No interlocking portions are provided, such that the joint 207 between adjacent tiles is not waterproof.

A second course 202, comprising two tiles 200, is disposed partially overlapping the first course 201, with the tiles offset such that a joint 207 between the tiles 200 of the second course 202 lies directly between two joints 207 between the tiles 200 of the first course 201.

Similarly, a third course 203, comprising a single tile 200, is disposed partially overlapping the second course 202, and offset from the second course 202, such that it is aligned with the first course 201; that is, a joint 207 between tiles 200 of the third course 203 would align with joints 207 between the tiles 200 of the first course 201.

(b) shows a cross-section through the arrangement of (a) along line B-B. The tiles 200 of the first 201, second 202 and third 203 courses overlap by a headlap 209, and are offset from each other by a gauge 211, equal to the spacing of adjacent roof battens 213.

FIG. 3 shows a first arrangement of tiles. A first course is shown in (a) comprising two double-lap tiles 301 and a single photovoltaic roof tile 302 therebetween.

(b) shows a second course arranged partially overlapping the first course, comprising two double-lap tiles 301, each arranged over the upper corners of the photovoltaic roof tile 302 of the first course.

(c) shows a third course identical to the first course, arranged to partially overlap the second course.

A dashed line is shown on the photovoltaic roof tile 302 of the first course, demonstrating the region 305 that would have been available to sunlight in a conventional double-lap arrangement, and the additional region 307 that has been made available due to the present arrangement.

FIG. 4 shows a second arrangement of tiles. A first course is shown in (a) comprising two double-lap tiles 401 and a single photovoltaic roof tile 402 therebetween.

(b) shows a second course arranged partially overlapping the first course, comprising a single double-lap tile 401, arranged over the upper-left corner of the photovoltaic roof tile 402 of the first course, and a single photovoltaic roof tile 402, arranged over the upper-right corner of the photovoltaic roof tile 402 of the first course.

(c) shows a third course arranged to partially overlap the second course, comprising a single double-lap tile 401, arranged over the upper-left corner of the double-lap tile 401 of the second course, and a single photovoltaic roof tile 402, arranged over the upper-right corner of the double-lap tile 401 of the second course and upper-left corner of the photovoltaic roof tile 402 of the second course.

(c) also shows a fourth course identical to the second course, arranged to partially overlap the third course.

A dashed line is shown on the photovoltaic roof tile 402 of the first course, demonstrating the region 405 that would have been available to sunlight in a conventional double-lap arrangement, and the additional region 407 that has been made available due to the present arrangement.

FIG. 5 shows a third arrangement of tiles. A first course is shown in (a) a single double-lap tile 501 adjacent to a first photovoltaic roof tile 502, which in turn is adjacent to a second photovoltaic roof tile 502.

(b) shows a second course arranged partially overlapping the first course, comprising a single double-lap tile 501, arranged over the upper-left corner of the first photovoltaic roof tile 502 of the first course, and a single double-lap tile 501, arranged over the upper-right corner of the first photovoltaic roof tile 502 of the first course.

(c) shows a third course identical to the first course, arranged to partially overlap the second course.

A dashed line is shown on the first photovoltaic roof tile 502 of the first course, demonstrating the region 505 that would have been available to sunlight in a conventional double-lap arrangement, and the additional region 507 that has been made available due to the present arrangement.

The invention claimed is:

1. An arrangement of roof tiles forming a part of a roof, the arrangement comprising:
   a plurality of double-lap tiles, each double-lap tile having a common double-lap tile height and a common double-lap tile width; and
   a plurality of photovoltaic roof tiles having a tile height equal to the common double-lap tile height and a tile width equal to an integral multiple of the double-lap tile width;
   the arrangement of roof tiles configured with:
   a first course of tiles comprising:

a first photovoltaic roof tile of the plurality of photovoltaic roof tiles; and
a second course of tiles arranged partially over the first course of tiles, and longitudinally offset from the first course of tiles by a longitudinal distance equal to a gauge of the roof, the second course of tiles comprising:
a first overlapping tile selected from either of the plurality of double-lap tiles and the plurality of photovoltaic roof tiles, the first overlapping tile arranged to overlap a first upper corner of the first photovoltaic roof tile by a lateral distance equal to half the double-lap tile width;
a second overlapping tile selected from either of the plurality of double-lap tiles and the plurality of photovoltaic roof tiles, the second overlapping tile arranged to overlap a second upper corner of the first photovoltaic roof tile by a lateral distance equal to half the double-lap tile width; and
wherein a vacancy in the second course is provided between the first and second overlapping tiles, over the first photovoltaic roof tile;
a third course of tiles arranged partially over the first and second courses of tiles, longitudinally offset from the second course of tiles by a longitudinal distance equal to the gauge of the roof, and longitudinally offset from the first course of tiles by a longitudinal distance equal to twice the gauge of the roof, the third course of tiles comprising:
at least one top photovoltaic roof tile arranged to entirely overlap a top lateral edge of the first photovoltaic roof tile.

2. A method of tiling a roof, the method comprising the steps of:
providing a plurality of double-lap tiles, each double-lap tile having a common double-lap tile height and a common double-lap tile width; and
providing a plurality of photovoltaic roof tiles having a tile height equal to the common double-lap tile height and a tile width equal to an integral multiple of the double-lap tile width; and
arranging the plurality of double-lap tiles and the plurality of photovoltaic roof tiles such that:
a first course of tiles comprises:
a first photovoltaic roof tile of the plurality of photovoltaic roof tiles; and
a second course of tiles arranged partially over the first course of tiles, and longitudinally offset from the first course of tiles by a longitudinal distance equal to a gauge of the roof, the second course of tiles comprising:
a first overlapping tile selected from either of the plurality of double-lap tiles and the plurality of photovoltaic roof tiles, the first overlapping tile arranged to overlap a first upper corner of the first photovoltaic roof tile by a lateral distance equal to half the double-lap tile width;
a second overlapping tile selected from either of the plurality of double-lap tiles and the plurality of photovoltaic roof tiles, the second overlapping tile arranged to overlap a second upper corner of the first photovoltaic roof tile by a lateral distance equal to half the double-lap tile width; and
wherein a vacancy in the second course is provided between the first and second overlapping tiles, over the first photovoltaic roof tile;
a third course of tiles arranged partially over the first and second courses of tiles, longitudinally offset from the second course of tiles by a longitudinal distance equal to the gauge of the roof, and longitudinally offset from the first course of tiles by a longitudinal distance equal to twice the gauge of the roof, the third course of tiles comprising:
at least one top photovoltaic roof tile arranged to entirely overlap a top lateral edge of the first photovoltaic roof tile.

3. An arrangement of roof tiles forming a part of a roof, the arrangement comprising:
a plurality of double-lap tiles, each double-lap tile having a common double-lap tile height and a common double-lap tile width; and
a plurality of photovoltaic roof tiles having a tile height equal to the common double-lap tile height and a tile width equal to an integral multiple of the double-lap tile width;
the arrangement of roof tiles configured with:
a first course of tiles comprising:
a first photovoltaic roof tile of the plurality of photovoltaic roof tiles; and
an adjacent tile selected from the plurality of double-lap tiles and the plurality of photovoltaic roof tiles, the adjacent tile arranged adjacent to the first photovoltaic roof tile;
a second course of tiles arranged partially over the first course of tiles, and diagonally offset from the first course of tiles by a lateral distance equal to one half of the double-lap tile width and a longitudinal distance equal to a gauge of the roof, the second course of tiles comprising:
an overlapping tile selected from either of the plurality of double-lap tiles and the plurality of photovoltaic roof tiles, the overlapping tile arranged to overlap an upper corner of the first photovoltaic roof tile by a first lateral overlap distance equal to half the double-lap tile width, and arranged to overlap an upper corner of the adjacent tile adjacent to the upper corner of the first photovoltaic roof tile by a second lateral overlap distance equal to at least half the double-lap tile width; and
wherein a vacancy in the second course is provided adjacent to the overlapping tile, over the first photovoltaic roof tile;
a third course of tiles arranged partially over the first and second courses of tiles, diagonally offset from the second course of tiles by a lateral distance equal to one half of the double-lap tile width and a longitudinal distance equal to the gauge of the roof, and longitudinally offset from the first course of tiles by a longitudinal distance equal to twice the gauge of the roof, the third course of tiles comprising:
at least one top photovoltaic roof tile arranged to entirely overlap a top lateral edge of the first photovoltaic roof tile.

4. The arrangement of roof tiles of claim 3, wherein:
the first course of tiles further comprises a further adjacent tile selected from the plurality of double-lap tiles and the plurality of photovoltaic roof tiles, the further adjacent tile arranged adjacent to the first photovoltaic roof tile, on an opposite side thereof to the adjacent tile;
the second course of tiles further comprises a further overlapping tile selected from either of the plurality of double-lap tiles and the plurality of photovoltaic roof tiles, the further overlapping tile arranged to overlap a further upper corner of the first photovoltaic roof tile and an upper corner of the further adjacent tile adjacent to the further upper corner of the first photovoltaic roof tile; and wherein the vacancy in the second course is further provided adjacent to the further overlapping tile.

5. A method of tiling a roof, the method comprising the steps of:
providing a plurality of double-lap tiles, each double-lap tile having a common double-lap tile height and a common double-lap tile width; and
providing a plurality of photovoltaic roof tiles having a tile height equal to the common double-lap tile height and a tile width equal to an integral multiple of the double-lap tile width; and
arranging the plurality of double-lap tiles and the plurality of photovoltaic roof tiles such that:
a first course of tiles comprises:
a first photovoltaic roof tile of the plurality of photovoltaic roof tiles; and
an adjacent tile selected from the plurality of double-lap tiles and the plurality of photovoltaic roof tiles, the adjacent tile arranged adjacent to the first photovoltaic roof tile;
a second course of tiles is arranged partially over the first course of tiles, and diagonally offset from the first course of tiles by a lateral distance equal to one half of the double-lap tile width and a longitudinal distance equal to a gauge of the roof, the second course of tiles comprising:
an overlapping tile selected from either of the plurality of double-lap tiles and the plurality of photovoltaic roof tiles, the overlapping tile arranged to overlap an upper corner of the first photovoltaic roof tile by a first lateral overlap distance equal to half the double-lap tile width, and arranged to overlap an upper corner of the adjacent tile adjacent to the upper corner of the first photovoltaic roof tile by a second lateral overlap distance equal to at least half the double-lap tile width; and
wherein a vacancy in the second course is provided adjacent to the overlapping tile, over the first photovoltaic roof tile;
a third course of tiles is arranged partially over the first and second courses of tiles, diagonally offset from the second course of tiles by a lateral distance equal to one half of the double-lap tile width and a longitudinal distance equal to a gauge of the roof, and longitudinally offset from the first course of tiles by a longitudinal distance equal to twice the gauge of the roof, the third course of tiles comprising:
at least one top photovoltaic roof tile arranged to entirely overlap a lateral edge of the first photovoltaic roof tile.

* * * * *